US011405405B2

(12) United States Patent
Hon

(10) Patent No.: US 11,405,405 B2
(45) Date of Patent: Aug. 2, 2022

(54) AGGREGATION OF NETWORK ACCESS TO TENANT SPACES OF MULTI-TENANT STRUCTURES

(71) Applicant: Xiber, LLC, Indianapolis, IN (US)

(72) Inventor: Stephen Hon, Indianapolis, IN (US)

(73) Assignee: Xiber, LLC, Indianapolis, IN (US)

( * ) Notice: Subject to any disclaimer, the term of this patent is extended or adjusted under 35 U.S.C. 154(b) by 311 days.

(21) Appl. No.: 16/827,069

(22) Filed: Mar. 23, 2020

(65) Prior Publication Data
US 2020/0304515 A1 Sep. 24, 2020

Related U.S. Application Data

(60) Provisional application No. 62/822,162, filed on Mar. 22, 2019.

(51) Int. Cl.
*H04L 29/06* (2006.01)
*H04L 9/40* (2022.01)

(52) U.S. Cl.
CPC ................................ *H04L 63/107* (2013.01)

(58) Field of Classification Search
CPC .......................... H04L 41/0886; H04L 63/107
See application file for complete search history.

(56) References Cited

U.S. PATENT DOCUMENTS

| 6,023,464 | A  | * | 2/2000  | Woundy | H04L 29/12047 370/352 |
| 2010/0062766 | A1 | * | 3/2010  | Cook | H04M 1/72502 455/435.1 |
| 2013/0067525 | A1 | * | 3/2013  | Wang | H04N 17/004 725/111 |
| 2016/0359693 | A1 | * | 12/2016 | Carter | H04L 12/4633 |
| 2018/0287874 | A1 | * | 10/2018 | Rzezak | G06F 21/602 |

* cited by examiner

*Primary Examiner* — Richard A McCoy
(74) *Attorney, Agent, or Firm* — Taft Stettinius & Hollister LLP

(57) ABSTRACT

Systems and methods include aggregating network access to tenant spaces distributed among multi-tenant structures with each multi-tenant structure having a network access configuration to access a network architecture. Embodiments of the present disclosure relate to identifying the network access configuration for the multi-tenant structure. The network access configuration provides the multi-tenant structure access to the network architecture so that each tenant space has access to the network architecture. Network access parameters are determined in real-time that each tenant space network device is to have access to execute as provided by a central network aggregation control system that determines the network access for each tenant space network device. The network access parameters regulate access that each tenant space network device has to the network architecture. The network access parameters are aggregated to each tenant space network device to grant each tenant space network device access to the network architecture.

10 Claims, 3 Drawing Sheets

AGGREGATION OF NETWORK ACCESS TO TENANT SPACES OF MULTI-TENANT STRUCTURES

BACKGROUND

Large apartment complexes and/or other tenant facilities such as condominiums and/or town homes are often typically managed by a single management entity. That single management entity may not only manage a single apartment complex at a single location but may also manage numerous apartment complexes, condominium complexes, and/or town home facilities that are positioned in numerous different geographic locations. In doing so, the single management entity may be responsible for provisioning different types of network access to each of the numerous tenants that inhabit the apartment complexes, condominium complexes, and/or town home facilities.

The management entity responsible for granting the appropriate network access for each tenant is required to manage such network access for numerous tenants at numerous different locations. Such network access that is to be provisioned differs per tenant. Conventionally, the management entity is required to determine the appropriate network access that each tenant is entitled to and then arrange for the tenant to obtain the appropriate network access. The network access for the different complexes differs from fiber, coax, Ethernet, and so on adding further difficulty to managing the network access for the tenants located in different complexes managed by the single management entity. Such manual determination and allocation absorbs significant resources for the management entity for numerous tenants located in different complexes with each of the complexes having different network access and each of the tenants being provisioned different levels of network access.

BRIEF SUMMARY

Embodiments of the present disclosure relate to a system that enables a management entity that is responsible for provisioning the appropriate network access to numerous tenants inhabiting numerous apartment complexes, condominium facilities, and/or town home facilities positioned at different locations to automatically execute the provisioning in real-time based on the level of network access that each tenant is entitled. A network access control system may be implemented to aggregate network access to a plurality of tenant paces distributed among a plurality of multi-tenant structures with each of the multi-tenant structures having a network access configuration to access a network architecture. The system includes at least one processor and a memory coupled with the processor. The memory includes instructions that when executed by the processor cause the processor to identify the network access configuration from a plurality of network access configurations for the multi-tenant structure that the network access control system is associated. The network access configuration provides the multi-tenant structure access to the network architecture so the each of the tenant spaces included in the multi-tenant structure has access to the network architecture. The processor is configured to determine in real-time a plurality of network access parameters that each tenant space network device associated with each corresponding tenant space is to have access to execute as provided by a central network aggregation control system that determines the network access for each tenant space network device. The network access parameters regulate a level of access that each tenant space network device has to the network architecture. The processor is configured to aggregate the network access parameters to each tenant space network device to grant each tenant space network device access to the network architecture via the network access configuration associated with the multi-tenant structure based on the network access parameters aggregated to each tenant space network device.

In an embodiment, a method may be implemented for aggregating network access to a plurality of tenant spaces distributed among a plurality of multi-tenant structures with each of the multi-tenant structures having a network access configuration to access a network architecture. The network access configuration may be identified from a plurality of network access configurations for the multi-tenant structure that the network access control system is associated. The network access control system provides the multi-tenant structure access to the network architecture so that each of the tenant spaces included in the multi-tenant structure has access to the network architecture. A plurality of network access parameters that each tenant space network device associated with each corresponding tenant space is to have access to execute may be determined as provided by a central network aggregation control system that determines the network access for each tenant space network device. The network access parameters regulate a level of access that each tenant space network device has to the network architecture. The network access parameters may be aggregated to each tenant space network device to grant each tenant space network device access to the network architecture via the network access configuration associated with the multi-tenant structure based on the network access parameters aggregated to each tenant space network device.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements.

DETAILED DESCRIPTION

Embodiments of the disclosure generally relate to providing a management entity that is responsible to manage the provisioning of network access to the numerous tenants of the numerous apartments, condominiums, and/or town house complexes managed by the management entity to automatically execute the provisioning but in doing so providing the appropriate level of network access to the user that has been granted the permission to the appropriate level of network access. In an example embodiment, the management entity is responsible for provisioning the appropriate network access to numerous different tenants that are inhabiting numerous different complexes positioned in different locations as well as having different access to the network. In doing so, the management entity may automatically aggregate the appropriate level of network access to each tenant in real-time despite the tenants being located in different complexes with each of the different complexes having different access to the network such as fiber, coax, Ethernet, and so on.

For example, the management entity may automatically grant the user the appropriate level of network access in real-time as that level of network access changes based on whether the user is current on their monthly payment for the level of network access and/or the level of network access that the user is granted changes. Regardless as to the access to the network that the complex that the tenant is residing accesses the network, the management entity may easily in real-time automatically grant the appropriate level of network access to the user based on the permissions that user currently has to access the network.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

System Overview

Figure 1:
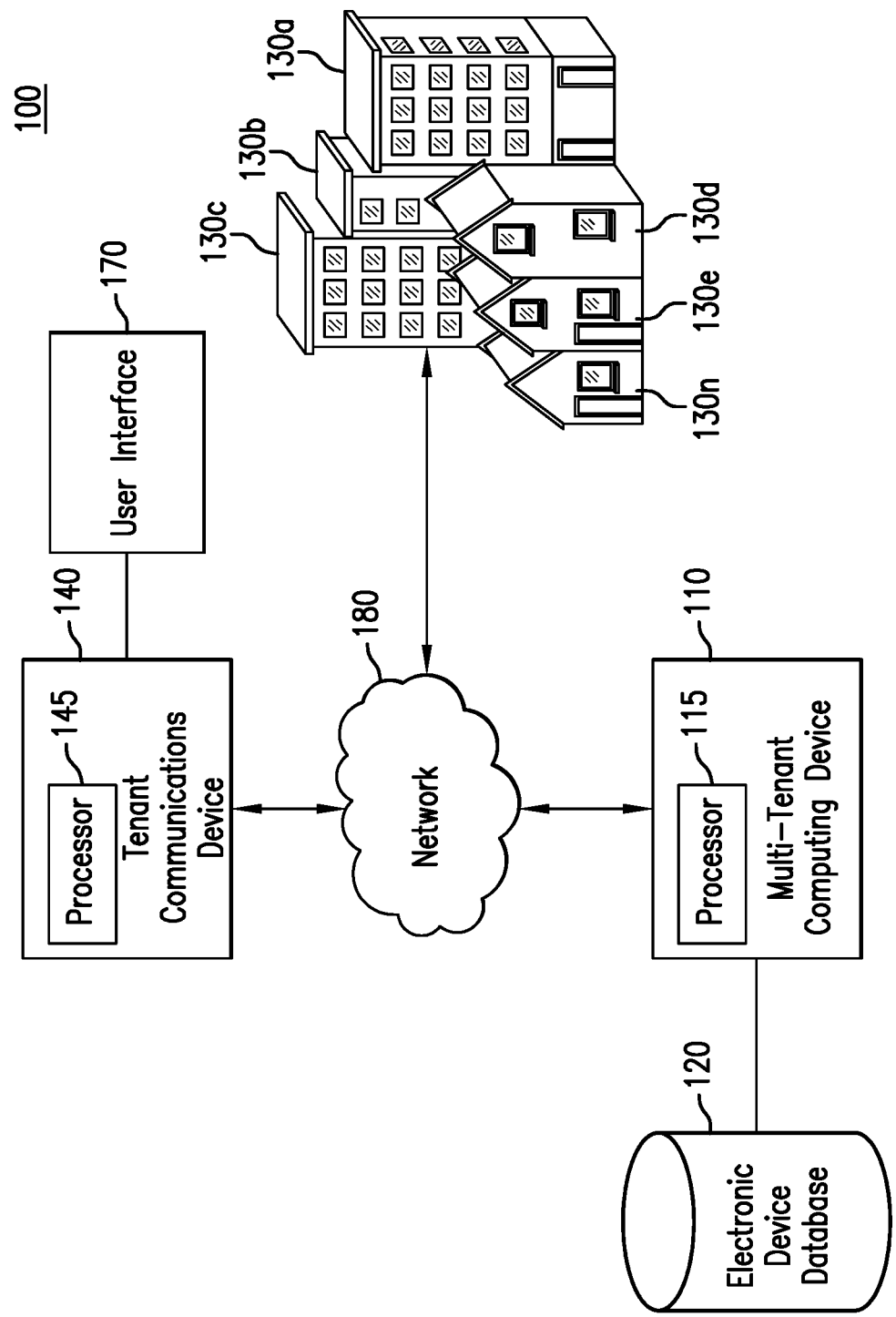
FIG. 1 shows an illustration of a multi-tenant structure control system.

As shown in FIG. 1, a multi-tenant structure control system 100 includes a multi-tenant computing device 110, an electronic device database 120, a tenant communications device 140, a user interface 170, a network 180, and a plurality of multi-tenant structures 130(a-n), where n is an integer equal to or greater than one. Multi-tenant computing device 110 includes a processor 115. User communications device 140 includes a processor 145.

Multi-tenant computing device 110 may aggregate wireless control of a plurality of electronic devices (not shown) associated with a multi-tenant structure 130(a-n) to enable a user to engage in wireless control of the electronic devices associated with permissions granted to the user. Multi-tenant structures 130(a-n) may include structures where numerous tenants may inhabit multi-tenant structures 130(a-n). For example, multi-tenant structure 130a is an apartment building that includes numerous different apartments that may be inhabited by numerous different tenants with each tenant leasing a corresponding apartment included in multi-tenant structure 130a. Each tenant may be granted permissions to access specific portions of multi-tenant structure 130a that each of the tenants are inhabiting based on the lease agreement agreed between each of the tenants and the owner of multi-tenant structure 130a. For example, each tenant that is inhabiting apartment building 130b is granted access to the corresponding apartment that the owner of the apartment building 130b has agreed to lease to each tenant to inhabit.

Multi-tenant structures 130(a-n) may also include structures where numerous owners may inhabit multi-tenant structures 130(a-n). For example, multi-tenant structure 130c is a condominium building that includes numerous different condominiums that may be inhabited by numerous different owners with each owner owning a corresponding condominium included in multi-tenant structure 130c. Each owner may be granted permissions to access specific portions of multi-tenant structure 130a that each of the owners are inhabiting based on the ownership agreement agreed upon between each of the owners and the owner of multi-tenant structure 130c. For example, each owner that is inhabiting condominium building 130c is granted access to the corresponding condominium that the owner of the condominium building 130c has agreed to sell to each owner to inhabit. For simplicity, the space that a tenant and/or owner that is granted permission to inhabit may be referred to the tenant space from here on out.

As a result, multi-tenant structures 130(a-n) include structures where numerous tenants and/or owners are granted permissions to inhabit and in doing so multi-tenant structures 130(a-n) are managed by a managing entity such that as each tenant and/or owner inhabit multi-tenant structures 130(a-n), such inhabitance and/or use of multi-tenant structures 130(a-n) by each tenant and/or owner is managed by the managing entity. For example, the managing entity may maintain multi-tenant structures 130(a-n) such that the user in inhabiting multi-tenant structures 130(a-n) is maintained to be of sufficient quality for the tenants and/or owners. In such an example, each tenant and/or owner may request that the managing entity take action to perform repairs of the tenant space that they are residing and so on. In another example, the managing entity may manage the permissions that each tenant and/or owner may have under the corresponding agreement with the owner of multi-tenant structures 130(a-n). In such an example, the managing entity may ensure that each tenant and/or owner has access to and the use of the corresponding network access that the tenant and/or owner have permissions to access while not having access to other network access resources that the tenant and/or owner do not have permissions to inhabit.

Thus, multi-tenant structures 130(a-n) include structures where the permissions of numerous tenants and/or owners to have network access is managed by the managing entity of multi-tenant structures 130(a-n). In doing so, the managing entity grants and/or revokes the permissions of each tenant and/or structure as well as maintain the permissions of each tenant and/or structure based on the agreement each tenant and/or owner has with the owner of multi-tenant structures 130(a-n) to have network access. Multi-tenant structures 130(a-n) may include but are not limited to apartment complexes, condominium complexes, town house complexes, houses positioned in sub-divisions, gated sub-divisions of houses, and/or any other type of multi-tenant structure 130(a-n) that includes a plurality of tenants and/or owners that have been granted permissions to inhabit multi-tenant structures 130(a-n) and such permissions are maintained by a management entity that will be apparent to those skilled in the relevant art(s) without departing from the spirit and scope of the invention. Multi-tenant structures 130(a-n) may be positioned in the same geographic location, positioned in different geographic locations, and/or any other type of position relative to each other such that the management entity continues to maintain the permissions to inhabit multi-tenant structures 130(a-n) of each tenant and/or owner that will be apparent to those skilled in the relevant art(s) without departing from the spirit and scope of the invention.

The permissions for each tenant and/or owner that inhabit multi-tenant structures 130(a-n) may be associated with granting the appropriate network access to each tenant and/or owner of the appropriate tenant space that each tenant and/or owner have entered an agreement to inhabit that is granted network access to each tenant and/or owner via the agreement. For example, each tenant and/or owner may be granted the permissions to have the appropriate network access to the actual tenant space to have high-speed internet as well as digital cable television that each tenant and/or owner has been granted permission to inhabit in based on the agreement. In another example, each tenant and/or owner may be granted the permissions to have network access that is on a pay by use subscription where each tenant and/or owner is to pay for the network access before actually gaining access to the network access.

The permissions for each tenant and/or owner that inhabit multi-tenant structures 130(a-n) may also be associated with preventing the inappropriate network access to any tenant and/or owner that is prevented any such access via the agreement. For example, each tenant and/or owner may be prevented network access to any tenant space that each tenant and/or owner has not been granted permission to have network access based on the agreement. In doing so, each tenant and/or owner is only granted permission to have network access the specific tenant space that each tenant and/or owner has been granted permission to have network access via the agreement while preventing any such network access to any tenant space that any tenant and/or owner has not been granted permissions to inhabit. In such an example, only tenants and/or owners that are paying for high definition cable television may have network access to the high definition television while the other tenants and/or owners that are not paying for high definition television via the agreement may not have access to the high definition television.

As noted above, multi-tenant structures 130(a-n) may include numerous tenant spaces that is managed by a single management entity. Often times the single management entity may manage numerous multi-tenant structures 130(a-n) that are positioned in different geographic locations. With such numerous tenant spaces, the single management entity may manage numerous transactions where the occupation of the tenant space is transitioning from users that are terminating their agreement to inhabit the tenant space to users that are entering into their agreement to inhabit the tenant space. Such numerous transitions of move-ins of new users to tenant spaces with the move-outs of the previous users out of the tenant spaces may occur at increased rates as the amount of tenant spaces managed by the management entity increases.

The management entity may be required to adequately provision the permissions to have network access to the new user as the new user first gains possession of the tenant space in that when by agreement the new user is first able to move into the tenant space. Failure to adequately provision the permissions to have the appropriate network access to the new user may prevent the new user from having the appropriate network access as provided to the new user under the agreement. For example, the failure to adequately provision the tenant with the level of network access that the tenant is paying for upon entering the agreement may result in the tenant having a lesser level of network access as that lesser level of network access was what the previous tenant paid for in the previous agreement despite having been granted permissions to for the higher level of network access via the agreement.

The management entity may also be required to adequately revoke the permissions of network access to the previous user that is first vacating possession of the tenant space in that when by agreement the previous user is first required to vacate the tenant space. Failure to adequately revoke the permissions to network access to the previous user that is vacating possession of the tenant space may provide the previous user with inappropriate access the network 180 of multi-tenant structures 130(a-n) that should no longer be provided to the previous user under the termination of the agreement. For example, the failure to adequately revoke the previous user with the network access to the wireless internet may result in the previous user to continue to have access wireless internet of the multi-tenant structure 130(a-n) despite the previous user having already moved out of the tenant space.

Rather than the management entity having numerous representatives on-site at each multi-tenant structure 130(a-n) to manually provision the appropriate permissions to the appropriate user upon move-in to each tenant space as well as revoke the appropriate permissions from the appropriate previous user upon move-out of each tenant space, multi-tenant computing device 110 may automatically aggregate network access based on the permissions associated with each user. In doing so, multi-tenant computing device 110 may also automatically revoke network access based on the terminated permission associated with each previous user. After the user has engaged in the agreement to inhabit the tenant space included in multi-tenant structures 130(a-n), multi-tenant computing device 110 may automatically aggregate network access to the user based on the permissions granted to the user by the agreement. Multi-tenant computing device 110 may then automatically revoke wireless control of the network access based on the permissions that are terminated upon the termination of the agreement.

Thus, multi-tenant computing device 110 may significantly decrease the complexity of the provisioning and/or revoking of the appropriate permissions by the representatives of the management entity. The representatives of the management entity no longer have to manually provision the appropriate permissions to the appropriate user upon move-in to each tenant space as well as revoke the appropriate permissions from the appropriate user upon move-out of each tenant space. Rather, multi-tenant computing device 110 may automatically aggregate the appropriate permissions to each user after each user has engaged the agreement to inhabit the tenant space included in multi-tenant structures 130(a-n) as well as automatically revoke the appropriate permissions to each former user upon termination of the agreement. In doing so, significantly less representatives of the management entity may be required to oversee the provisioning and/or revoking of the appropriate permissions as well as significantly decrease the risk of incorrectly provisioning and/or revoking inappropriate permissions to users and/or former users.

Rather than have numerous representatives of the management entity have to correctly provision the permissions of numerous users conducting move-ins to multi-tenant structures 130(a-n) as well as revoke the permissions of numerous former users upon move-outs of multi-tenant structures 130(a-n), multi-tenant computing device 110 may simply automatically provision the appropriate permissions to each user upon move-in as well as revoke the appropriate permissions from each former user upon move-out. Further, multi-tenant computing device 110 may automatically provision the appropriate permissions to each user that has engaged in the agreement to inhabit the tenant space as well as revoke the appropriate permissions from former users that have terminated the agreement from multi-tenant structures 130(*a-n*) that are positioned in different geographic locations thereby further decreasing the amount of representatives required to oversee the provisioning and/or revoking of the appropriate permissions.

Examples of multi-tenant computing device 110 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

User communications device 140 may enable the user to wirelessly control electronic devices that engage the network access based on the permissions aggregated to user communications device 140 from multi-tenant computing device 110. After multi-tenant computing device 110 has automatically aggregated the appropriate permissions to the user to wirelessly control the appropriate electronic devices to engage the network access, multi-tenant computing device 110 may aggregate such appropriate permissions to user communications device 140 to thereby enable the user to wirelessly control each the network access of each electronic device via user communications device 140. In doing so, the user may easily control the network access of each of the electronic devices wirelessly via user communications device 140.

Examples of multi-tenant computing device 110 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

User interface 170 may include any type of display device including but not limited to a touch screen display, a liquid crystal display (LCD) screen, and/or any other type of display device that includes a display that will be apparent from those skilled in the relevant art(s) without departing from the spirit and scope of the present disclosure.

As shown, the appropriate permissions to the appropriate electronic devices as well as the wireless control of the electronic devices may be streamed between numerous use communications devices 140 and multi-tenant computing device 110 via network 180. Network 180 includes one or more networks, such as the Internet. In some embodiments of the present disclosure, network 180 may include one or more wide area networks (WAN) or local area networks (LAN). Network 180 may utilize one or more network technologies such as Ethernet, Fast Ethernet, Gigabit Ethernet, virtual private network (VPN), remote VPN access, a variant of IEEE 802.11 standard such as Wi-Fi, and the like.

Communication over network 180 takes place using one or more network communication protocols including reliable streaming protocols such as transmission control protocol (TCP). Each of the numerous user communications devices 140 may interface with multi-tenant computing device 110 via network 180 through an application programming interface (API), web interface and/or any other type of interface that will be apparent from those skilled in the relevant art(s) without departing from the spirit and scope of the present disclosure. These examples are illustrative and not intended to limit the present disclosure.

System Overview of Network Access to Tenant Spaces

Figure 2:
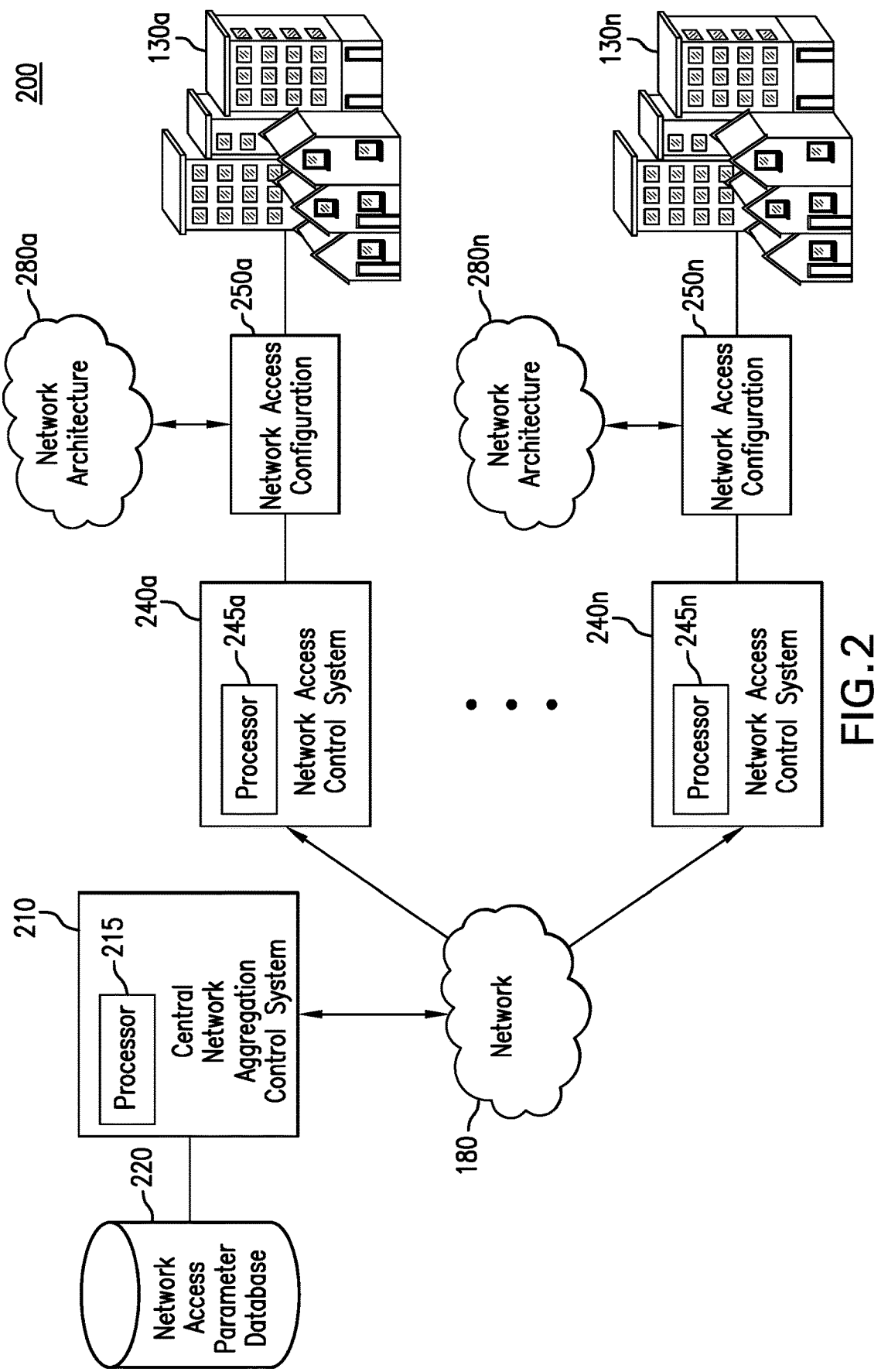
FIG. 2 shows an illustration of a network access control system.

As shown in FIG. 2, a network access control system 200 includes a central network aggregation control system 210, a network access parameter database 220, a plurality of network access control systems 240(*a-n*), where n is an integer equal to or greater than two and equal to the quantity of multi-tenant structures 130(*a-n*), a plurality of network access configurations 250(*a-n*), where n is an integer equal to or greater than two and equal to the quantity of network access control systems 240(*a-n*), a plurality of network architectures 280(*a-n*), where n is an integer equal to or greater than two and equal to the quantity of network access control systems 240(*a-n*), a network 180, and a plurality of multi-tenant structures 130(*a-n*), where n is an integer equal to or greater than two.

Network access control systems 240(*a-n*) may aggregate network access to a plurality of tenant spaces (not shown) among a plurality of multi-tenant structures 130(*a-n*) with each multi-tenant structure 130(*a-n*) having a network access configuration 250(*a-n*) to access a network architecture 280(*a-n*). Each of the different multi-tenant structures 130(*a-n*) may include numerous different tenant spaces. Each of the users that inhabit each of the corresponding tenant spaces may request to have network access. For example, each of the users that inhabit a corresponding tenant space included in multi-tenant structures 130(*a-n*) may have agreed upon when entering into an agreement to inhabit the tenant space to have network access such that each of the users may access network 180, such access the Internet as well as other network 180 supported services when located in the tenant space. Network access is the capability for each tenant space to access network 180, such as access to the Internet as well as other network 180 supported services independently of each other tenant space included multi-tenant structures 130(*a-n*) such that each user that inhabits each corresponding tenant space may access network 180 and/or utilize network 180 based on the network access granted to them based on the agreement to inhabit the tenant space but also to access network 180 independent of the network access of each other user that inhabits each other tenant space included in multi-tenant structures 130(*a-n*).

As noted above, the network access that each user may be granted access dependent upon the network access provided in the agreement to inhabit the tenant space may provide access to network 180 as requested by the user independent of the network access of each other user that inhabits multi-tenant structures 130(*a-n*) via network 180. Network 180 includes one or more networks, such as the Internet. In some embodiments of the present disclosure, network 180 may include one or more wide area networks (WAN) or local area networks (LAN). Network 180 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 180 takes place using one or more network communication protocols including reliable streaming protocols such as transmission control protocol (TCP). Each of the numerous user communications devices 140 may interface with multi-tenant computing device 110 via network 180 through an application programming interface (API), web interface and/or any other type of interface that will be apparent from those skilled in the relevant art(s) without departing from the spirit and scope of the present disclosure. These examples are illustrative and not intended to limit the present disclosure.

Each of the different multi-tenant structures 130(a-n) may be positioned at a different geographic location such that the tenant spaces included in each of the corresponding multi-tenant structures 130(a-n) may also be located at different geographic locations based on the multi-tenant structure 130(a-n) that each corresponding tenant space is located. However, each of the different multi-tenant structures 130(a-n) may be managed by the single management entity in that the single management entity manages different multi-tenant structures 130(a-n) despite each different multi-tenant structure 130(a-n) being positioned in different geographic locations. In doing so, the single management entity is responsible for managing the network access of numerous different tenant spaces with the tenant spaces being positioned in different geographic locations depending on the geographic location of multi-tenant structure 130(a-n) that each of the tenant spaces are positioned. Thus, the single management entity is managing the network access of numerous different tenant spaces in a multi-site setting such that the single management entity is required to manage the network access of numerous different tenant spaces positioned in multiple different geographic locations based on the geographic location of each multi-tenant structure 130(a-n) that each of the tenant spaces is included.

Conventionally, the management of the network access of numerous different tenant spaces with the tenant spaces being positioned in different geographic locations is a difficult task for a management entity. Conventionally, each multi-tenant structure 130(a-n) positioned at a different geographic location has corresponding individual conventional management systems positioned at each different geographic location for each different multi-tenant structure 130(a-n) to manage the level of network access for each user associated with each tenant space included in corresponding multi-tenant structure 130(a-n). The property manager positioned at each geographic location of each multi-tenant structure 130(a-n) then manages the network access of the numerous tenant spaces included in multi-tenant structure 130(a-n) positioned at the geographic location that the property manager is responsible via the conventional management system positioned at that geographic location. However, such management of network access by an individual in the property managers is conventionally a daunting task for the property managers to execute manually. Often times, each user associated with each tenant space may have a different level of network access based on the agreement that each user entered into when inhabiting the tenant space requiring the property manager to continuously monitor the level of network access for each user associated with each tenant space and adjust the level of network access via the conventional management system when appropriate.

Further, the level of network access for each user associated with each tenant space may be dynamically adjusted based on the level of network access that the user requires each month in that the user may request to adjust the level of network access based on the network access requirements of the user as well as the cost for the level of network access that the user is willing to pay. Thus, each month the level of network access for each user associated with each tenant space may adjust thereby significantly increasing the difficulty in the property managers manually managing such dynamic adjusting of the level of network access for each of the tenant spaces included in each multi-tenant structure 130(a-n) positioned at the different geographic locations. The level of network access is the amount of features that the user associated with the tenant space may access network 180 with based on the network access parameters that have been granted to the user. For example, the user may have a level of network access to network 180 from the tenant space that includes Wi-Fi as well as digital cable television and digital video recording (DVR) capabilities at an increased data streaming speed. However, in another example, the user may have of a level of network access to network 180 from the tenant space that includes a wireline connection to the Internet as well as simply having basic cable television at a decreased data streaming speed.

Rather than have the property managers at each geographic location manually manage the dynamic adjusting of the level of network access of each user associated with each tenant space included in each multi-tenant structure 130(a-n) positioned at different geographic locations based on the conventional management system positioned at each different geographic location, a network access control system 240(a-n) may be positioned at each geographic location of each multi-tenant structure 130(a-n). Each network access control system 240(a-n) may act as a control plane and control the level of network access of each user associated with each tenant space included in each corresponding multi-tenant structure 130(a-n). Each network access control system 240(a-n) may then act as a data plane and then enable the appropriate data to stream from network 180 to each corresponding tenant space based on the level of network access granted to each tenant space via the network access parameters.

As noted above, requiring each property manager to manually manage the level of network access for each user associated with each tenant space included in multi-tenant structure 130(a-n) that each property manager is responsible via the conventional management system positioned at each multi-tenant structure 130(a-n) may be a daunting task for each property manager. Further, the single management entity may manage numerous multi-tenant structures 130(a-n) located in numerous different geographic locations. For example, the single management entity may manage the level of network access for thousands of tenant spaces included in hundreds of multi-tenant structures 130(a-n) with each multi-tenant structure 130(a-n) positioned in hundreds of different geographic locations. In order to alleviate the manual management of the level of network access for each user associated with each of the numerous tenant spaces included in a single multi-tenant structure 130(a-n) from the property managers responsible for managing each different multi-tenant structure 130(a-n), the single management entity may centralize such management of network access for all of the numerous tenant spaces included in all of the numerous multi-tenant structures 130(a-n) positioned in all of the different geographic locations.

However, centralizing such management of network access for all of the numerous tenant spaces included in all of the numerous multi-tenant structures 130(a-n) positioned in all of the different geographic locations with each of the different geographic locations having a different conventional management system associated with the corresponding multi-tenant structure 130(a-n) positioned at the corresponding different geographic location is also a daunting task. The management of network access for tenant spaces positioned in a multi-site configuration with the tenant spaces included in different multi-tenant structures 130(a-n) positioned in different geographic locations is a daunting task to each multi-tenant structure 130(a-n) having a different conventional management system to manually manage the level of network access for each tenant space included in the corresponding multi-tenant structure 130(a-n). Each conventional management system positioned at each multi-tenant structure 130(a-n) may be different and may handle different levels of network access for the tenant spaces included in the corresponding multi-tenant structure 130(a-n) as well as having different network access configurations 250(a-n) that each multi-tenant structure 130(a-n) may have access to network 180. Due to such differences in the network access per multi-tenant structure 130(a-n), centralizing the control of such network access by managing each conventional management system positioned at each multi-tenant structure 130(a-n) is not a trivial endeavor.

Rather than centralizing the control of such network access by managing each conventional management system positioned at each multi-tenant structure 130(a-n) in a multi-site configuration, network access control system 240(a-n) may be positioned at each location of each multi-tenant structure 130(a-n). Network access control system 240(a-n) may then dynamically control the level of network access for each tenant space included in the corresponding multi-tenant structure 130(a-n) based on the network access parameters aggregated to each tenant space as provided by central network aggregation control system 210. Central network aggregation control system 210 may be a centralized control system 210 that may dynamically determine the level of network access that each tenant space is to have regardless as to the geographic location of the corresponding multi-tenant structure 130(a-n) is geographically located. As the status regarding the level of access that each tenant space is entitled adjusts in real-time regardless as to the geographic location the corresponding multi-tenant structure 130(a-n) that the tenant space is included, central network aggregation control system 210 may dynamically adjust such level of network access for each tenant space by dynamically adjusting the network access parameters regarding the level of network access for each tenant space.

The network access parameters regulate a level of network access that each tenant space network device has to network architecture 280(a-n). The network access parameters may be based on the level of network access that each user associated with each corresponding tenant space is entitled based on the agreement that each user has to inhabit the tenant space and/or the agreement that each user has with the network access provider. As a result, the network access parameters may be based on the level of network access that the user has agreed to compensate for either through the agreement with the single management entity to inhabit the corresponding space and/or through the agreement to access the network with the network access provider. For example, the network access parameters may include granting the user associated with the tenant space the level of network access that includes an increased data streaming speed as well as wireless access to network 180 via Wi-Fi. In another example, the network access parameters may include terminating any type of network access to the user associated with the tenant space that has been granted no level of network access by central network aggregation control system 210.

Each network access control system 240(a-n) may then determine the network access parameters in real-time for each tenant space included in the corresponding multi-tenant structure 130(a-n) that each network access control system 240(a-n) is positioned as provided by central network aggregation control system 210. In doing so, the control plane as to the level of network access that each tenant space is to be provided is established between central network aggregation control system 210 and the corresponding network access control system 240(a-n) that is positioned at the corresponding multi-tenant structure 130(a-n) that each tenant space is included. For example, network access control system 240a may determine the network access parameters for each tenant space included in multi-tenant structure 130a that network access control system 240a is positioned as provided by central network aggregation control system 210 thereby establishing the control plane between central network aggregation control system 210 and network access control system 240a for the level of network access provided to each of the tenant spaces included in multi-tenant structure 130a. In another example, network access control system 240n may determine the network access parameters for each tenant space included in multi-tenant structure 130n that network access control system 240b is positioned as provided by central network aggregation control system 210 thereby establishing the control plane between central network aggregation control system 210 and network access control system 240n for the level of network access provided to each of the tenant spaces included in multi-tenant structure 130n.

In doing so, the control of the network access for each of the numerous tenant spaces included in numerous different multi-tenant structures 130(a-n) located in numerous different geographic locations may be centralized to central network aggregation control system 210 that may determine in real-time the network access parameters for each tenant space regardless as to the geographic location of the tenant space. Each network access control system 240(a-n) positioned at the geographic location for each corresponding multi-tenant structure 130(a-n) may then control the level of network access for each of the tenant spaces included in the corresponding multi-tenant structure 130(a-n) by establishing the control plane for those tenant spaces between central network aggregation control system 210 and the corresponding network access control system 240(a-n). The corresponding network access control system 240(a-n) may then dynamically adjust the level of network access for each tenant space included in each corresponding multi-tenant structure 130(a-n) based on the network access parameters provided by central network aggregation control system 210. Thus, the single management entity may centralize the control of the network access for tenant spaces positioned in numerous different geographic locations in a multi-site configuration without having to manually engage the conventional management system positioned at each different multi-tenant structure 130(a-n).

Examples of network access control system 240(a-n) may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the invention.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Central network aggregation control system 210 includes a processor, a memory, and a network interface, herein after referred to as a computing device or simply "computer". For example, central network aggregation control system 210 may include a data information system, a data management system, web server, and/or file transfer server. Central network aggregation control system 210 may also be a workstation, mobile device, computer, cluster of computers, set-top box, a cloud server or other computing device.

In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

In addition to acting as the control plane, each network access control system 240(*a-n*) may also act as a data plane and enable the appropriate data to stream from network 180 to each corresponding tenant space based on the level of network access granted to each tenant space via the network access parameters. In doing so, each network access control system 240(*a-n*) may stream the appropriate data from network 180 to each tenant space included in each corresponding multi-tenant structure 130(*a-n*) based on the level of network access granted to each tenant space via the network access parameters. As noted above, each network access control system 240(*a-n*) may be positioned at the geographic location of the corresponding multi-tenant structure 130(*a-n*) and control the level of network access for each tenant space included in the corresponding multi-tenant structure 130(*a-n*) that each network access control system 240(*a-n*) is positioned.

In a similar manner, each network access control system 240(*a-n*) may also control the streaming of data from network 180 to each of the tenant spaces included in each corresponding multi-tenant structure 130(*a-n*) that each network access control system 240(*a-n*) is positioned at the same geographic location. For example, network access control system 240*a* is positioned at the same geographic location as multi-tenant structure 130*a*. Network access control system 240*a* may act as the data plane between network 180 and the tenant spaces included in multi-tenant structure 130*a* such that network access control system 240*a* may determine the data that is to be streamed to each of the tenant spaces included in multi-tenant structure 130*a* based on the network access parameters provided by central network aggregation control system 210 and then stream the appropriate data to each of the tenant spaces included in multi-tenant structure 130*a* based on the network access parameters for each tenant space. In another example, network access control system 240*n* is positioned at the same geographic location as multi-tenant structure 130*n*. Network access control system 240*n* may act as the data plane between network 180 and the tenant spaces included in multi-tenant structure 130*n* such that network access control system 240*n* may determine the data that is to be streamed to each of the tenant spaces included in multi-tenant structure 130*n* based on the network access parameters provided by central network aggregation control system 210 and then stream the appropriate data to each of the tenant spaces included in multi-tenant structure 130*n* based on the network access parameters for each tenant space.

However, each multi-tenant structure 130(*a-n*) may have a corresponding network access configuration 250(*a-n*) in which each multi-tenant structure 130(*a-n*) accesses the corresponding network architecture 280(*a-n*). Each network access configuration 250(*a-n*) provides the corresponding multi-tenant structure 130(*a-n*) access to the corresponding network architecture 280(*a-n*) so that each of the tenant spaces included in the corresponding multi-tenant structure 130(*a-n*) has access to the corresponding network architecture 280(*a-n*). In doing so, each network access configuration 250(*a-n*) is positioned at the geographic location of each corresponding multi-tenant structure 130(*a-n*) and includes the network infrastructure and/or hardware to provide the corresponding multi-tenant structure 130(*a-n*) access to the corresponding network architecture 280(*a-n*). For example, network access configuration 250*a* may include the network infrastructure of a fiber optic cable and the appropriate hardware to connect to the fiber optic cable to provide multi-tenant structure 130*a* network access to network architecture 280*a* via the fiber infrastructure and hardware provided by network access configuration 250*a*. In another example, network access configuration 250*n* may include the network infrastructure of a DS-3 line and the appropriate hardware to connect to the DS-3 line to provide multi-tenant structure 130*n* network access to network architecture 280*n* via the DS-3 infrastructure and hardware provided by network access configuration 250*n*.

Each network architecture 280(*a-n*) may be the architecture in which each corresponding network access configuration 250(*a-n*) connects to network 180 such that the appropriate data is streamed from network 180 to each tenant space included in each corresponding multi-tenant structure 130(*a-n*) such that each tenant space has network access to network 180. For example, network architecture 280*a* may be a fiber optic network architecture such that corresponding network access configuration 250*a* includes the appropriate fiber infrastructure and hardware to access the fiber optic network architecture included in network architecture 280*a*. In doing so, the appropriate data may be streamed from network 180 to each tenant space included in multi-tenant structure 130*a* such that each tenant space has network access to network 180 via the fiber optic network architecture included in network architecture 280*a*. In another example, network architecture may be a copper cable network architecture such that corresponding network access configuration 250*n* includes the appropriate copper cable infrastructure and hardware to access the copper cable network architecture included in network architecture 280*n*. In doing so, the appropriate data may be streamed from network 180 to each tenant space included in multi-tenant structure 130*n* such that each tenant space has network access to network 180 via the copper cable network architecture included in network architecture 280*n*. In an embodiment, each network architecture 280(*a-n*) may also be considered network 180 such that each network access configuration 250(*a-n*) may access network 180 directly to provide each corresponding multi-tenant structure 130(*a-n*) access to network 180.

However, each network access configuration 250(*a-n*) may be different such that each network access configuration 250(*a-n*) includes a different infrastructure and hardware to access the corresponding network architecture 280(*a-n*) for each corresponding multi-tenant structure 130(*a-n*). For example, network architecture 280*a* may be a fiber optic network architecture such that corresponding network access configuration 250*a* includes the appropriate fiber infrastructure and hardware to access the fiber optic network architecture included in network architecture 280*a* to gain network access to network 180. In another example, network architecture 280*n* may be a copper cable network architecture such that corresponding network access configuration 250*n* includes the appropriate copper cable infrastructure and hardware to access the copper cable network architecture included in network architecture 280*n* to gain access to network 180. Thus, the single management entity may be required to manage the network access for numerous different tenant spaces included in numerous different multi-tenant structures 130(*a-n*) with each multi-tenant structures 130(*a-n*) having numerous different network access configuration 250(*a-n*) to access network 180.

The single management entity in managing the network access of numerous different tenant spaces in a multi-access setting such that the single management entity is required to manage the network access of numerous different tenant spaces included in numerous different multi-tenant structures 130(*a-n*) with each multi-tenant structure 130(*a-n*) accessing network 180 via numerous different network access configurations 280(*a-n*). Rather than simply managing the network access for the numerous different tenant spaces that access network 180 via the same network access configurations 280(*a-n*), the single management entity may be required to manage the network access of numerous different tenant spaces in a multi-access setting with each of the numerous different tenant spaces accessing network 180 via different network access configurations 280(*a-n*).

Conventionally, the management of the network access of numerous different tenant spaces with the tenant spaces accessing network 180 with different network access configurations 250(*a-n*) is a difficult task for a management entity. Conventionally, each multi-tenant structure 130(*a-n*) positioned with a different corresponding network access configuration 250(*a-n*) requires that the management entity manage the network access for each multi-tenant structure 130(*a-n*) individually based on the different corresponding network access configuration 250(*a-n*). The property manager positioned at each multi-tenant structure 130(*a-n*) then manages the network access of the numerous tenant spaces included in multi-tenant structure 130(*a-n*) with the corresponding network access configuration 250(*a-n*) that the property management is responsible. However, such management of network access by an individual in the property managers is conventionally a daunting task for the property managers to execute manually. Further, any attempt to conventionally centralize the management of the network access of the numerous different tenant spaces to consolidate the management of the network access often times fails due to the difficulty of managing the network access of numerous different tenant spaces that access network 180 via numerous different network access configurations 250(*a-n*).

Network access control system 240(*a-n*) may be positioned at each geographic location of each multi-tenant structure 130(*a-n*) such that each network access control system 240(*a-n*) may access each corresponding network access configuration 250(*a-n*) positioned at the corresponding geographic location of each corresponding multi-tenant structure 130(*a-n*). Each network access control system 240(*a-n*) may act as a data plane and control the data that is streamed from network 180 to each user associated with each tenant space included in each corresponding multi-tenant structure 130(*a-n*) based on the network access parameters provided by central network aggregation control system 210. Each network access control system 240(*a-n*) may then enable the appropriate data to stream from network 180 to each corresponding tenant space based on the level of network access granted to each tenant space via the network access parameters.

As noted above, the single management entity may manage numerous multi-tenant structures 130(*a-n*) located in numerous different geographic locations with each of the numerous different multi-tenant structures 130(*a-n*) access network 180 via numerous different network access configurations 250(*a-n*) positioned at each of the different multi-tenant structures 130(*a-n*). For example, the single management entity may manage the level of network access for thousands of tenant spaces included in hundreds of different multi-tenant structures 130(*a-n*) positioned in different geographic locations with each of the hundreds of different multi-tenant structures 130(*a-n*) having different network access configurations 250(*a-n*) positioned at each of the different multi-tenant structures 130(*a-n*). In order to alleviate the manual management of the level of network access for each user associated with each of the numerous tenant spaces included in a single multi-tenant structure 130(*a-n*) from the corresponding property manager, the single management entity may successfully centralize such management of network access for all of the numerous tenant spaces included in all of the numerous multi-tenant structures 130(*a-n*) positioned at all of the different geographic locations despite each of the numerous multi-tenant structures 130(*a-n*) having different network access configurations 250(*a-n*).

However, centralizing such management of network access for all of the numerous tenant spaces included in all of the numerous multi-tenant structures 130(*a-n*) positioned in all of the different geographic locations with each of the different geographic locations having a different network access configuration 250(*a-n*) is a difficult technical challenge to overcome. Consolidating the management of network access for all of the numerous tenant spaces accessing different network access configurations 250(*a-n*) is a difficult technical challenge to overcome in that each tenant space may be accessing network 180 on a different network access configuration 250(*a-n*). Any centralized management of network access for the numerous tenant spaces has to somehow control the network access of the numerous different tenant spaces as the control plane as well as stream the appropriate data to each of the numerous tenant spaces via different network access configurations 250(*a-n*) as the data plane. Due to such differences in network access configurations 250(*a-n*), centralizing the flow of data of such network access for the tenant spaces included in each multi-tenant structure 130(*a-n*) is not a trivial endeavor.

Network access control system 240(*a-n*) may be positioned at each location of each multi-tenant structure 130(*a-n*). In doing so, network access control system 240(*a-n*) may access the corresponding network access configuration 250(*a-n*) also positioned at the location of the corresponding multi-tenant structure 130(*a-n*). Network access control system 240(*a-n*) may then dynamically stream the appropriate data from network 180 to each tenant space included in the corresponding multi-tenant structure 130(*a-n*) based on the network access for each tenant space as determined by the network access parameters provided by central network aggregation control system 210. Network access control system 240(*a-n*) in being positioned at the location of the corresponding multi-tenant structure 130(*a-n*) and accessing the corresponding network access configuration 250(*a-n*) also positioned at the location of the corresponding multi-tenant structure 130(*a-n*) may account for the type of network infrastructure and hardware included in the corresponding network access configuration 250(a-n). In doing so, network access control system 240(a-n) may act as a conduit for the data that is streamed from network 180 to the corresponding multi-tenant structure 130(a-n) via the corresponding network access configuration 250(a-n).

As a result, each network access control system 240(a-n) may accommodate for each of the different network access configurations 250(a-n) that each of the numerous tenant spaces included in each of the numerous multi-tenant structures 130(a-n) may gain network access to network 180 thereby enabling the single management entity to manage the network access for a multi-access configuration. Each network access control system 240(a-n) may also enable the single management entity to manage the network access for numerous tenant spaces included in numerous different multi-tenant structures 130(a-n) located in numerous different geographic locations for a multi-site configuration. In doing so, each network access control system 240(a-n) may stream the appropriate data to each tenant space in accommodating for each corresponding network access configuration 250(a-n) positioned at the corresponding multi-tenant structure 130(a-n) based on the network access parameters for each tenant space as provided by central network aggregation control system 210.

For example, network access control system 240a may stream data to a first tenant space at a level of network access that includes an increased data streaming speed and digital cable television as well as a wireless access to network 180 via Wi-Fi to the first tenant space included in multi-tenant structure 130a via a fiber optic network infrastructure included in network access configuration 250a. Network access control system 240a may stream the data via the fiber optic network infrastructure based on being able to access the fiber optic network infrastructure included in network access configuration 250a when positioned at the location of network access configuration 250a. Network access control system 240a may then stream the data via the level of network access of increased data streaming speed and digital cable television as well as wireless access to network 180 via Wi-Fi based on the network access parameters provided by central network aggregation control system 210.

In another example, network access control system 240n may stream data to a second tenant space at a level of network access that includes a decreased data streaming speed and basic cable television as well as wireline access to network 180 to the second tenant space included in multi-tenant structure 130n via DS-3 copper network configuration included in network access configuration 250n. Network access control system 240n may stream the data via the DS-3 copper network configuration based on being able to access the DS-3 copper network configuration included in network access configuration 250n when positioned at the location of network access configuration 250n. Network access control system 240n may then stream the data via the level of network access of decreased data streaming speed and basic cable television as well as wireline access to network 180 based on the network access parameters provide by central network aggregation control system 210.

Thus, the single management entity may centralize the control of the level of network access for numerous different tenant spaces located at numerous different geographic locations in a multi-site configuration as well as centralize the streaming of data to the numerous different tenant spaces with network access via numerous different network access configurations 250(a-n). In doing so, the single management entity may accommodate for the numerous different network access configurations 250(a-n) to ensure the appropriate data is streamed to each tenant space at the appropriate level of network access for each tenant space based on the network access parameters provided by central network aggregation control system 210.

Network access configurations 250(a-n) may include but not limited to fiber infrastructure, copper cable infrastructure, DS-1 infrastructure, DS-3 infrastructure, coaxial cable infrastructure, hybrid-fiber Ethernet network infrastructure, hybrid coax infrastructure, docsys over coax infrastructure, and/or any other type of network infrastructure and/or hardware that may access corresponding network architecture 280(a-n) and/or network 180 that will be apparent to those skilled in the relevant art(s) without departing from the spirit and scope of the disclosure.

Automatic Aggregation of Network Access to Tenant Spaces

As noted above, network access control system 240(a-n) may automatically aggregate access to tenant spaces distributed among multi-tenant structures 130(a-n) with each multi-tenant structure 130(a-n) having a different network access architecture 250(a-n) to access network architecture 280(a-n). In doing so, network access control system 240(a-n) may operate as a control plane in which the level of network access that each tenant space is to be provided is centralized with central network aggregation control system 210. Central network aggregation control system 210 and network access control system 240(a-n) may establish a control plane and determine in real-time the level of network access that each tenant space is to be provided based on network access parameters for each tenant space as provided by central network aggregation control system 210. Network access control system 240(a-n) may then act as the data plane for each tenant space in enabling the appropriate data to flow from network 180 to each tenant space at the level of network access granted to each tenant space and in doing so accommodating for each network access configuration 250(a-n) that each tenant space accesses network 180 through.

Figure 3:
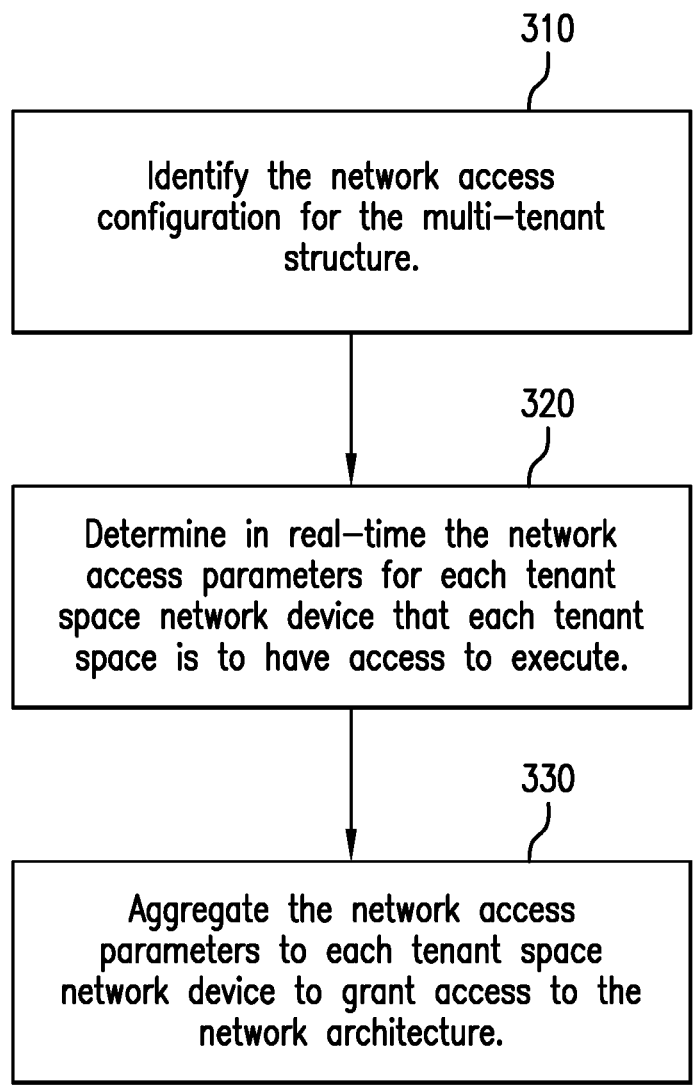
FIG. 3 shows an illustration of a method for aggregating network access.

One such implementation of aggregating network access is illustrated in process 300 in FIG. 3. Process 300 includes three primary steps: identify the network access configuration for the multi-tenant structure 310, determine in real-time the network access parameters for each tenant space network device that each tenant space is to have access to execute 320, and aggregate the network access parameters to each tenant space network device to grant access to the network architecture 330. Steps 310-330 are typically implemented in a computer, e.g., via software and/or hardware, e.g., network access control system 240(a-n).

In step 310, network access control system 240(a-n) may identify the network access configuration 250(a-n) from a plurality of network access configurations 250(a-n) for the multi-tenant structure 130(a-n) that the network access control system 240(a-n) is associated. Network access configuration 240(a-n) provides the multi-tenant structure 130(a-n) access to the network architecture 280(a-n) so that each of the tenant spaces included in the multi-tenant structure 130(a-n) has access to the network architecture 280(a-n). As noted above, network access control system 240(a-n) may enable the single management entity to manage the level of network access for each of the numerous tenant spaces included in each of the numerous multi-tenant structures 130(a-n) regardless as to the network access configurations 250(a-n) in which each of the numerous tenant spaces access network 180. In doing so, network access control system 240(a-n) enables the single management entity to manage the level of network access in that network access control system 240(a-n) enables the single management entity to centralize the control of the level of network access for each tenant space as well as the data that flows to each tenant space.

Network access control system 240(a-n) may identify the corresponding network access configuration 250(a-n) from each of the numerous different network access configurations 250(a-n) associated with each of the different multi-tenant structures 130(a-n) based on the geographic positioning of network access control system 240(a-n) relative to the corresponding network access configuration 250(a-n). Network access control system 240(a-n) may be positioned at the geographic location of the corresponding multi-tenant structure 130(a-n) such that network access control system 240(a-n) may access the corresponding network access configuration 250(a-n) also positioned at the corresponding geographic location of the corresponding multi-tenant structure 130(a-n). In doing so, network access control system 240(a-n) may accommodate for the network infrastructure and/or hardware included in the corresponding network access control system 240(a-n) also positioned at the corresponding geographic location of the corresponding multi-tenant structure 130(a-n) thereby enabling the appropriate data to flow to each tenant space included in the corresponding multi-tenant structure 130(a-n) from network 180.

In an embodiment, network access control system 240(a-n) may determine the network access configuration 250(a-n) from the plurality of network access configurations 250(a-n) for the multi-tenant structure 130(a-n) based on a network access circuit that is positioned at the multi-tenant structure 130(a-n) and provides access to the network architecture 280(a-n) via the network access configuration 250(a-n) associated with the network access circuit for each of the tenant spaces included in the multi-tenant structure 130(a-n). A network access circuit is a circuit that is positioned at the geographic location of the corresponding multi-tenant structure 130(a-n) and is provisioned to provide the corresponding multi-tenant structure 130(a-n) access to network architecture 250(a-n) via the corresponding network access configuration 250(a-n). For example, the network access circuit may be a fiber optic circuit that is positioned at the geographic location of multi-tenant structure 130a and is provisioned to provide access to the fiber optic network architecture included in network architecture 280a via the fiber infrastructure and hardware included in network access configuration 250a also positioned at the geographic location of multi-tenant structure 130a.

In an embodiment, network access control system 240(a-n) may be connected to the network access circuit that is positioned at the geographic location of the corresponding multi-tenant structure 130(a-n). In positioning network access control system 240(a-n) at the geographic location of the corresponding multi-tenant structure 130(a-n) such that network access control system 240(a-n) may connect to the network access circuit, network access control system 240(a-n) may then be configured to route the appropriate data to the appropriate tenant space included in the corresponding multi-tenant structure 130(a-n) as propagated from the corresponding network architecture 280(a-n) via the corresponding network access configuration 250(a-n) also connected to the network access circuit.

For example, the network access circuit may be a hybrid-fiber Ethernet circuit that is positioned at the geographic location of multi-tenant structure 130n and is provisioned to provide access to the hybrid-fiber Ethernet network architecture included in network architecture 280n via the hybrid-fiber Ethernet infrastructure and hardware included in network access configuration 250n also positioned at the geographic location of multi-tenant structure 130n. Network access control system 240n may also be positioned at the geographic location of multi-tenant structure 130n such that network access control system 240n may connect to the hybrid-fiber Ethernet circuit. Network access control system 240n may then be configured to route the appropriate data to the appropriate tenant space as routed from the hybrid-fiber Ethernet architecture included in network architecture 280n via hybrid-fiber Ethernet infrastructure and hardware included in network access configuration 250n.

As a result, each multi-tenant structure 130(a-n) in the plurality of multi-tenant structures 130(a-n) includes the network access control system 240(a-n) from the plurality of network access control systems 240(a-n) that is positioned at a location of each corresponding multi-tenant structure 130(a-n). Each multi-tenant structure 130(a-n) in the plurality of multi-tenant structures 130(a-n) is positioned at a different geographic location from each other multi-tenant structure 130(a-n) thereby having each corresponding network access control system 240(a-n) positioned at a different geographic location of each other network access control system 240(a-n). Network access control system 240(a-n) may then identify each network access configuration 250(a-n) form the plurality of network access configurations 250 (a-n) for each multi-tenant structure 130(a-n) that each network access control system 240(a-n) is associated. Each network access configuration 250(a-n) is positioned at a different geographic location from each other network access configuration 250(a-n) based on each geographic location of each corresponding multi-tenant structure 130 (a-n).

Thus, regardless as to the network access configuration 250(a-n) for each multi-tenant structure 130(a-n), network access control system 240(a-n) may act as a data plane and stream the appropriate data to each tenant space included in each multi-tenant structure 130(a-n) from network 180 via network access configuration 250(a-n). In doing so, network access control system 240(a-n) may provide the single management entity with a multi-site and multi-access configuration. Regardless as to whether network access configuration 250(a-n) is a fiber optic network, DS-3 network, coax network, hybrid-fiber Ethernet network, hybrid doscys over coax network and so on, network access control system 240(a-n) may be able to accommodate for the network access configuration 250(a-n) positioned at each multi-tenant structure 130(a-n) to allow the appropriate data to stream to each tenant space from network 180. In an example embodiment, step 310 may be performed by processor 245(a-n) of network access control systems 240(a-n).

In step 320, network access control system 240(a-n) may determine in real-time a plurality of network access parameters that each tenant space network device (not shown) associated with each corresponding tenant space is to have access to execute as provided by a central network aggregation control system 210 that determines the network access for each tenant space network device. The network access parameters regulate a level of access that each tenant space has to the network architecture 280(a-n). Each tenant space may have a corresponding tenant space network device that is associated with each tenant space. The tenant space network device may be the device that enables the user to access network 180 when located in the tenant space. For example, the tenant space network device may be a modem that is capable of accessing network 180 in each of the different types of network access listed above regarding network 180.

As noted above, the single management entity may be responsible in managing the level of network access for numerous tenant spaces. For example, the single management entity may be responsible in managing the level of network access of thousands of tenant spaces. The level of network access for each of the numerous tenant spaces may not be static but may change. For example, a user associated with a first tenant space may request to upgrade the level of network access from a decreased streaming speed that is streamed through a wireline connection to an increased streaming speed that is streamed via a Wi-Fi connection. A second user associated with a second tenant space may default on their payment for the network access and thereby be denied at network access after having network access that is streamed at an increased streaming speed via a Wi-Fi connection with digital cable and DVR.

The network access parameters for each tenant space computing device may be adjusted and with numerous tenant computing devices having network access parameters be adjusted determining the appropriate level of network access for each of the numerous tenant space computing devices is a daunting task. Central network aggregation control system 210 may determine the network access parameters for each of the numerous tenant computing devices as each of the network access parameters for each of the numerous tenant computing devices are adjusted in real-time. As each network parameter for each of the numerous tenant computing devices is adjusted, central network aggregation control system 210 may determine such adjustment of the network access parameters in real-time. Realtime is the period of time in which the network parameter is adjusted such that central network aggregation control system 210 may determine the adjustment of the network parameter as the adjustment occurs. Central network aggregation control system 210 may determine the adjustment of network access parameters in any period of time following the adjustment of the network access parameters that will be apparent to those skilled in the relevant art(s) without departing from the spirit and scope of the invention.

In doing so, the continuous adjustment of the network access parameters for the numerous different tenant computing devices may be centralized and managed via central network aggregation control system 210 such that each user may be granted the appropriate level of network access based on the network access parameters associated with the corresponding tenant computing device at the time each user attempts to access network 180. Regardless as to whether the user fails to remain current in paying for their level of network access and/or the user adjusts the level of network access to either increase the level of network access and/or decrease the level of network access, central network aggregation control system 210 may determine such adjustment in real-time and adjust the network access parameters for each corresponding tenant computing device, accordingly.

Network access control system 240(a-n) may identify each tenant space network device that is included in multi-tenant structure 130(a-n) that network access control system 240(a-n) is associated based on a unique identifier associated with each of the tenant space network devices associated with each corresponding tenant space included in multi-tenant structure 130(a-n). Each unique identifier associated with each one of the tenant space network devices enables each of the tenant space network devices to access network architecture 280(a-n) via network access configuration 250(a-n). For example, network access control system 240(a-n) may identify each tenant space network device based on the MAC address for each tenant space network device.

Network access control system 240(a-n) may then establish a control plane for each tenant space network device in that the control plane is established between central network aggregation control system 210 and network access control system 240(a-n). As the network access parameters for each tenant space network device are adjusted, central network aggregation control system 210 may determine the adjusted network access parameters for each tenant space network device in real-time based on the unique identifier for each tenant space network device. Central network aggregation control system 210 may then provide the adjusted network access parameters to network access control system 240(a-n) and network access control system 240(a-n) may then determine the adjusted network access parameters in real-time for each tenant space network device based on the unique identifier for each tenant space network device. In doing so, network access control system 240(a-n) may accommodate for the changing levels of network access for numerous different tenant space network devices as such levels of network access are adjusted in real-time. In an example embodiment, step 320 may be performed by processor 245(a-n) of network access control system 240(a-n).

In step 330, network access control system 240(a-n) may aggregate the network access parameters to each tenant space network device to grant each tenant space network device access to network architecture 280(a-n) via network access configuration 250(a-n) associated with multi-tenant structure 130(a-n) based on the network access parameters to each tenant space network device. In doing so, network access control system 240(a-n) may establish a control plane between central network aggregation control system 210 and network access control system 240(a-n) in that the level of network access is adjusted in real-time based on the network access parameters for each tenant space network device aggregated from network access control system 240(a-n) to each corresponding tenant space network device based on the unique identifier for each corresponding network device. Network access control system 240(a-n) may also establish a data plane between network access control system 240(a-n) and each tenant space network device such that the appropriate data is streamed from network architecture 280(a-n) via network access configuration 250(a-n) based on the network access parameters for each tenant space network device.

Regardless as to the style of network access configuration 250(a-n), the type of network access configuration 250(a-n), the age of the network access configuration 250(a-n), the geographic location of each tenant space network device and so on, network access control system 240(a-n) may control the level of network access for each tenant space network device and then enable the appropriate streaming of data to each tenant space network device based on the network access configuration 250(a-n). In doing so, network access control system 240(a-n) may control the speed of the data streaming via network access configuration 250(a-n), whether the network access is on or off, whether the user is in arrears and not allowed network access, whether the user should be firewalled from certain network access and so on for each tenant space network device based on the network access parameters provided in real-time by central network aggregation control system 210. For example, central network aggregation control system 210 may determine the network access parameters for each tenant space network device based on the network access for each tenant space network device, the authentication of each tenant space network device, and/or the accounting as to the level of network access that each tenant space network device is entitled based on the payment for network access by the user.

Network access control system 240(a-n) may grant each tenant space network device access to network architecture 280(a-n) based on the geographic location of each tenant space network device that corresponds to the geographic location of each corresponding network access configuration 280(a-n). Network access control system 240(a-n) may grant each tenant space network device positioned in the plurality of multi-tenant structures 130(a-n) with each multi-tenant structure 130(a-n) positioned at a different geographic location and associated with a different network access configuration 250(a-n) to network architecture 280(a-n) based on the network access parameters aggregated to each corresponding tenant space network device as provided by central network aggregation control system 210.

Network access control system 240(a-n) may propagate network data between each tenant space network device associated with each corresponding tenant space included in multi-tenant structure 130(a-n) and network architecture 280(a-n) via network access configuration 250(a-n) associated with multi-tenant structure 130(a-n) based on the network access parameters aggregated to each tenant space network device. Network access control system 240(a-n) may adjust the level of access that each tenant space network device has to network architecture 280(a-n) in real-time when the network access parameters that each tenant space network device associated with each corresponding tenant space is to have access to execute is adjusted in real-time by central network aggregation control system 210. In an example embodiment, step 330 may be performed by processor 245(a-n) of network access control system 240(a-n).

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A network access control system for delivering an unique instance of network access to each of a plurality of tenants comprising:
   at least one processor wherein each of the at least one processors is coupled to at least one memory;
   a plurality of network access configurations,
      each of the plurality of network access configurations:
         is uniquely associated with one of a plurality of multi-tenant structures,
         wherein each of the multi-tenant structures comprises:
            a corresponding network architecture, and
            a plurality of tenant spaces,
            wherein each tenant space is uniquely associated with a tenant, and
         comprises:
            a first representation of a network access control system
            a circuit identifier that uniquely identifies the representation of the network access control system,
            a second representation of a multi-tenant structure of the plurality of multi-tenant structures,
            a third representation of a network architecture corresponding to the representation of the multi-tenant structure,
            a plurality of tenant space representations corresponding to the representation of the multi-tenant structure,
            a plurality of tenant space network device representations,
               wherein each of the plurality of tenant space network device representations corresponds to a tenant space network device located in a corresponding one of the plurality of tenant spaces and includes:
                  a corresponding mac address,
                  an associated representation of a tenant, and
                  a plurality of network access para meters that regulate a particular level of access to the corresponding network architecture corresponding to the second representation; and
            a plurality of unique associations wherein each of the plurality of unique associations includes one of the plurality of tenant space network devices representations and one of the tenant space representations;
   the plurality of multi-tenant structures,
      wherein each of the plurality of multi-tenant structures includes:
         a corresponding network access control system,
         the corresponding network architecture, and
         a corresponding one of the plurality of network access configurations,
            wherein the corresponding network access control system has access to only the corresponding one of the plurality of network access configurations
   a plurality of agreements wherein each of the plurality of agreements includes:
      a corresponding one of the plurality of tenant space representations,
      a corresponding third representation of a network architecture;
      a corresponding representation of a tenant, and
      a plurality of corresponding network access parameters that regulate a corresponding particular level of access to the corresponding third representation of the network architecture; and
   a central network aggregation control system in communications with:
      each of the plurality of agreements,
      each of the plurality of network access configurations, and each of the plurality of network access control system via a corresponding circuit that corresponds to a corresponding circuit identifier in the corresponding one of the plurality of network access configurations;

wherein for each of the plurality of agreements,
the central network aggregation control system propagates,
in a corresponding message to the corresponding network access control system via the corresponding circuit,
the corresponding plurality of network access parameters and
a corresponding tenant space network device representation;
wherein in response to the corresponding propagated message, the corresponding network access control system
acquires from the corresponding network access configuration, the
corresponding mac address corresponding to the tenant space network device representation,
acquires from the corresponding network access configuration, the corresponding third representation of a network architecture,
applies, using the corresponding mac address and the third representation, the corresponding plurality of network access parameters, and therefore
realizes the corresponding particular level of access for the corresponding tenant space network device according to the corresponding agreement of the plurality of agreements.

2. The network access control system of claim 1, wherein the network access control system is further configured to: determine the each network access configuration from the plurality of network access configurations for the multi-tenant structure based on a network access circuit identified by the circuit identifier that is positioned at the multi-tenant structure and provides access to the network architecture via the network access configuration associated with the network access circuit for each of the tenant spaces included in the multi-tenant structure.

3. The network access control system of claim 2, wherein the each multi-tenant structure in the plurality of multi-tenant structures includes the corresponding network access control system from the plurality of network access control systems that is positioned at a location of each corresponding multi-tenant structure.

4. The network access control system of claim 3, wherein the each multi-tenant structure in the plurality of multi-tenant structures is positioned at a different geographic location from each other multi-tenant structure thereby having each corresponding network access control system positioned at a different geographic location of each other network access control system.

5. The network access control system of claim 4, wherein one of the at least one processor is further configured to: identify each network access configuration from the plurality of network access configurations for each multi-tenant structure that each network access control system is associated, wherein each network access configuration is positioned at a different geographic location from each other network access configuration based on each geographic location of each corresponding multi-tenant structure.

6. The network access control system of claim 5, wherein one of the at least one processor is further configured to grant each corresponding tenant space network device access to the corresponding network architecture based on the geographic location of each tenant space network device that corresponds to the geographic location of each corresponding network access configuration.

7. The network access control system of claim 6, wherein the network access control system is further configured to grant each tenant space network device positioned in the plurality of multi-tenant structures with each multi-tenant structure positioned at a different geographic location and associated with a different network access configuration access to the network architecture based on the corresponding plurality of network parameters aggregated to the each corresponding tenant space network device as provided by a central network aggregation control system.

8. The network access control system of claim 1, wherein the network access control system is further configured to:
identify each tenant space network device that is included in the multi-tenant structure that the network access control system is associated based on a unique identifier associated with each of the tenant space network devices associated with each corresponding tenant space included in the multi-tenant structure, wherein each unique identifier associated with each one of the tenant space network devices enables each of the tenant space network devices to access the network architecture via the network access configuration.

9. The network access control system of claim 8, wherein the network access control system is further configured to propagate network data between each tenant space network device associated with each corresponding tenant space included as the multi-tenant structure and the network architecture via the network access configuration associated with the multi-tenant structure based on the corresponding plurality of network access parameters aggregated to the each corresponding tenant space network device.

10. The network access control system of claim 9, wherein the network access control system is further configured to adjust the level of network access that each tenant space network device has to the network architecture in real-time when the network access parameters that each tenant space network device associated with each corresponding tenant space is to have access to execute is adjusted in real-time by the central network aggregation control system.

* * * * *